US006839321B1

(12) United States Patent
Chiruvolu

(10) Patent No.: US 6,839,321 B1
(45) Date of Patent: Jan. 4, 2005

(54) DOMAIN BASED CONGESTION MANAGEMENT

(75) Inventor: Girish Vsr Chiruvolu, Richardson, TX (US)

(73) Assignee: Alcatel, Paris (FR)

( * ) Notice: Subject to any disclaimer, the term of this patent is extended or adjusted under 35 U.S.C. 154(b) by 918 days.

(21) Appl. No.: 09/618,196

(22) Filed: Jul. 18, 2000

(51) Int. Cl.$^7$ .............................................. H04L 12/26
(52) U.S. Cl. .................. 370/230.1; 370/231; 370/235.1
(58) Field of Search ................................ 370/229–236, 370/400, 401, 410, 412–416, 352–354; 710/52–57

(56) References Cited

U.S. PATENT DOCUMENTS

| 4,736,363 A | 4/1988 | Aubin et al. |
| 4,901,277 A | 2/1990 | Soloway et al. |
| 5,088,032 A | 2/1992 | Bosack |

(List continued on next page.)

FOREIGN PATENT DOCUMENTS

| DE | 43 16 872 A1 | 11/1994 |
| EP | 0 503 469 A2 | 9/1992 |
| WO | WO 00/41365 | 7/2000 |

OTHER PUBLICATIONS

F.M. Anjum et al. *Fair Bandwidth Sharing Among Adaptive and Non–Adaptive Flows in the Internet*, Proceedings IEEE Infocom 1999. The Conference on Computer Communications, 18$^{th}$ Annual Joint Conference of the IEEE Computer and Communications Societies, New York, New York, Mar. 21–25, 1999, Proceedings IEEE Infocom, The Computer Communica, vol. 3, Mar. 12, 1999, pp. 1412–1420.
W–J Kim et al., *The FB–Red Algorithm for TCP over ATM*, IEEE Globecom 1998, Globecom 1998, The Bridge to Global Integration, Sydney, Nov. 8–12, 1998, IEEE Global Telecommunications Conference, New York, New York, IEEE, US, vol. 1, Nov. 8, 1998, pp. 551–555.

Fair Bandwidth Sharing Among Adaptive and Non–Adaptive Flows in the Internet; Farooq M. Anjum , et al. XP–000878257; pp. 1412–1420.

The FB–Red Algorithm for TCP over ATM; Wood–June Kim, et al; XP–000894360; pp. 551–555.

Supporting Differentiated Services Using ATM ABR Service; Richard Rabbat, et al.; pp. 210–213.

Service Differentiation Through End–to End Rate Control in Low Bandwidth Wireless Packet Networks; Thyagarajan Nandagopal, et al.; pp. 211–220.

A Simple Packet Scheduling and Buffer Management Scheme for Scalable Support of QoS in the Internet; KJ Loh, et al.; pp. 276–281.

Randomized Token Buckets: Reducing the Buffers Required in Multiplexors, J. Andrew Fingerhut, et al., IEEE 1997, pp. 215–219.

*Primary Examiner*—Douglas Olms
*Assistant Examiner*—Van Kim T. Nguyen
(74) *Attorney, Agent, or Firm*—Sughrue, Mion, PLLC; Jessica W. Smith; V. Lawrence Sewell

(57) ABSTRACT

The Domain-based Congestion Management method and apparatus detects and regulates congestion in a Diff-serv network. It use an improvRED method for congestion detection at the core routers and token bucket filters for traffic regulation at the ingress nodes. In addition, improvRED also provides feedback control. ImprovRED uses three thresholds for detecting congestion: a minth, a maxth and a FeedbackThreshold, which lakes a value between the minth and the maxth thresholds. Whenever the average queue size is greater than minth and less than Feedback-Threshold, all outgoing packets are marked appropriately to indicate a potential onset of a congestion period. When the average queue size is greater th FeedbackThreshold (but less than maxth) packets are dropped probabilistically and all the outgoing packets are marked appropriately to denote the dropping phase. When the average queue size is greater than the maximum threshold, all incoming packets are dropped.

42 Claims, 16 Drawing Sheets

U.S. PATENT DOCUMENTS

| | | | | |
|---|---|---|---|---|
| 5,191,650 A | | 3/1993 | Kramer et al. | |
| 5,199,094 A | | 3/1993 | Schneider | |
| 5,377,327 A | | 12/1994 | Jain et al. | |
| 5,404,565 A | | 4/1995 | Gould et al. | |
| 5,408,562 A | | 4/1995 | Yoshizawa et al. | |
| 5,426,674 A | | 6/1995 | Nemirovsky et al. | |
| 5,430,729 A | | 7/1995 | Rahnema | |
| 5,521,972 A | | 5/1996 | Iki | |
| 5,596,722 A | | 1/1997 | Rahnema | |
| 5,644,713 A | | 7/1997 | Makishima | |
| 5,719,853 A | | 2/1998 | Ikeda | |
| 5,870,564 A | | 2/1999 | Jensen et al. | |
| 5,881,241 A | | 3/1999 | Corbin | |
| 5,884,043 A | | 3/1999 | Teplitsky | |
| 5,914,936 A | * | 6/1999 | Hatono et al. | 370/230 |
| 5,918,017 A | | 6/1999 | Attanasio et al. | |
| 5,996,021 A | | 11/1999 | Civanlar et al. | |
| 6,147,970 A | * | 11/2000 | Troxel | 370/235 |
| 6,252,848 B1 | * | 6/2001 | Skirmont | 370/229 |
| 6,333,917 B1 | * | 12/2001 | Lyon et al. | 370/412 |
| 6,404,735 B1 | * | 6/2002 | Beshai et al. | 370/230 |
| 6,424,624 B1 | * | 7/2002 | Galand et al. | 370/231 |
| 6,487,170 B1 | * | 11/2002 | Chen et al. | 370/231 |
| 6,510,160 B1 | * | 1/2003 | Nikuie et al. | 370/412 |
| 6,535,482 B1 | * | 3/2003 | Hadi Salim et al. | 370/229 |
| 6,556,578 B1 | * | 4/2003 | Silberschatz et al. | 370/412 |
| 6,614,756 B1 | * | 9/2003 | Morgenstern et al. | 370/230 |
| 6,618,378 B1 | * | 9/2003 | Giroux et al. | 370/395.1 |
| 6,643,260 B1 | * | 11/2003 | Kloth et al. | 370/235 |
| 6,646,988 B1 | * | 11/2003 | Nandy et al. | 370/235 |
| 6,657,962 B1 | * | 12/2003 | Barri et al. | 370/235 |
| 6,675,220 B1 | * | 1/2004 | McCloghrie et al. | 709/232 |
| 6,680,906 B1 | * | 1/2004 | Nguyen | 370/229 |
| 6,680,907 B1 | * | 1/2004 | Bonaventure | 370/229 |
| 6,690,645 B1 | * | 2/2004 | Aweya et al. | 370/230 |

* cited by examiner

DIFF-SERV DOMAIN (PRIOR ART)

```
On every packet arrival

Calculate the average queue size based on exponential moving weighted average ——100
if ( average queue size < minth) enqueue the packet ——110 if ( minth < average queue size < FeedbackThreshold )
{
    enqueue the packet, ——120
    mark the bits (bit1,bit2) for all outgoing packets queue with (1,0), if the bits are not
    previously set as (1,1) ——130
} if ( FeedbackThreshold ≤ average queue size < maxth)
{
    drop or enqueue the packet with the probability as decided by RED ——140
    mark the bits (bit1,bit2) for all outgoing packets with (1,1) ——150
} if (average queue size > maxth) drop the incoming packets ——160
```

MODIFICATIONS TO THE RED ALGORITHM AT CORE NODES

FIG. 2

| Bit1 | Bit2 | Inference at the egress node |
|---|---|---|
| 0 | 0 | No congestion detected so far up to this domain |
| 0 | 1 | No local congestion, but Congestion occurred in a prior domain |
| 1 | 0 | Local congestion occurred, but no packet loss phase |
| 1 | 1 | Local congestion occurred and in packet loss phase |

A SIMPLE TWO-BIT SCHEME FOR REPRESENTING LOCAL DOMAIN CONGESTION

FIG. 3

TOKEN BUCKET FILTER CONNECTED TO DIFF-SERV DOMAIN

COMPONENTS OF A TOKEN BUCKET FILTER

FLOWCHART FOR TBF-BASED RATE CONTROL METHOD

```
Initialize:           PktWt₀ʲ ← 1.0
PktWtʲ is always within [minPktWtʲ, maxPktWtʲ]
MD is a monotonously decreasing function that takes a value (0,1)
MI is a monotonously increasing function that takes a positive value
j denotes the label corresponding to fixed route between a given pair
of ingress/egress nodes for every ith round trip time (between ingress and egress nodes)

During congestion-free periods if (average TBF queue size at ingress node ≥ DemandThrshʲ)

PktWtᵢʲ ← PktWtᵢ₋₁ʲ * MD(PktWtᵢ₋₁ʲ)  ←—230

/* decrease the PktWtʲ during congestion free periods, based on demand
at TBF */ else {
        if (PktWtᵢ₋₁ʲ > 1) PktWtᵢʲ ← max[1, PktWtᵢ₋₁ʲ * MD(PktWtᵢ₋₁ʲ)]

if (PktWtᵢ₋₁ʲ < 1) PktWtᵢʲ ← min[1, PktWtᵢ₋₁ʲ * MI(PktWtᵢ₋₁ʲ)] }
/* restore PktWtʲ close to 1.0 */

At congestion notification time

PktWtᵢʲ ← (maxPktWtʲ - 1)(1 - PktWtᵢ₋₁ʲ) / (1 - minPktWtʲ) + 1      if PktWtᵢ₋₁ʲ < 1.

/* The smaller the PktWtʲ just before LCN, the bigger it will be during
congestion period. A uniform mapping of [minPktWtʲ, 1) on to
(1, maxPktWtʲ] intervals */ ←—250

During congestion period

PktWtᵢʲ ← PktWtᵢ₋₁ʲ * MI(PktWtᵢ₋₁ʲ)  if PktWtᵢ₋₁ʲ ≠ 1 ←—240

On receipt of congestion clearance notification

Select a random time less than RTT and,

PktWtᵢʲ ← PktWtᵢ₋₁ʲ * MD(PktWtᵢ₋₁ʲ)  ←—220
```

THE TBF-BASED CONGESTION MANAGEMENT ALGORITHM AT INGRESS NODES

FIG. 6B

STATE DIAGRAM OF PKTWT DYNAMICS

THE SIMULATION SETUP

| UTIL-IZATION | NON FEEDBACK SCHEME RED (CORE), % Pkt LOSS | DCM SCHEME % OF PACKET LOSS | | | OVERALL IMPROVEMENT WITH DCM (RELATIVE REDUCTION $\frac{(X-Y)}{X}$ IN PKT LOSS) |
|---|---|---|---|---|---|
| | AT CORE NODES (X) | AT CORE NODES | AT INGRESS TBFs | OVERALL LOSS CORE+TBFs (Y) | |
| 0.5 | 3.88 | 1.0859 | 1.4889 | 2.5748 | 33.76 |
| 0.6 | 8.00 | 2.1948 | 2.7775 | 4.9723 | 37.87 |
| 0.7 | 11.4 | 2.8461 | 3.9036 | 6.7498 | 40.79 |
| 0.8 | 12.8 | 2.8148 | 4.5384 | 7.3531 | 42.55 |
| 0.9 | 14.1 | 2.7192 | 6.3322 | 9.0514 | 35.81 |
| 1.0 | 16.6 | 2.6678 | 7.6945 | 10.3623 | 37.59 |
| 1.1 | 18.3 | 2.9650 | 10.3028 | 13.2677 | 27.54 |
| 1.2 | 19.3 | 2.8883 | 11.4976 | 14.3858 | 25.49 |
| 1.3 | 20.76 | 2.8530 | 12.7693 | 15.6223 | 24.75 |

PERFORMANCE OF THE PROPOSED DCM SCHEME

FIG. 10

| UTILIZATION | AVERAGE DELAY (SECONDS) AT INGRESS TBFs |
|---|---|
| 0.8 | 0.771937 |
| 0.9 | 0.924975 |
| 1.0 | 1.007773 |
| 1.1 | 1.273592 |
| 1.2 | 1.339390 |
| 1.3 | 1.389371 |

DELAY PERFORMANCE OF THE DCM SCHEME

FIG. 11

PKTWT DISTRIBUTION; UTIL. = 0.8

AVE. QUEUE SIZE AT AN INGRESS NODE

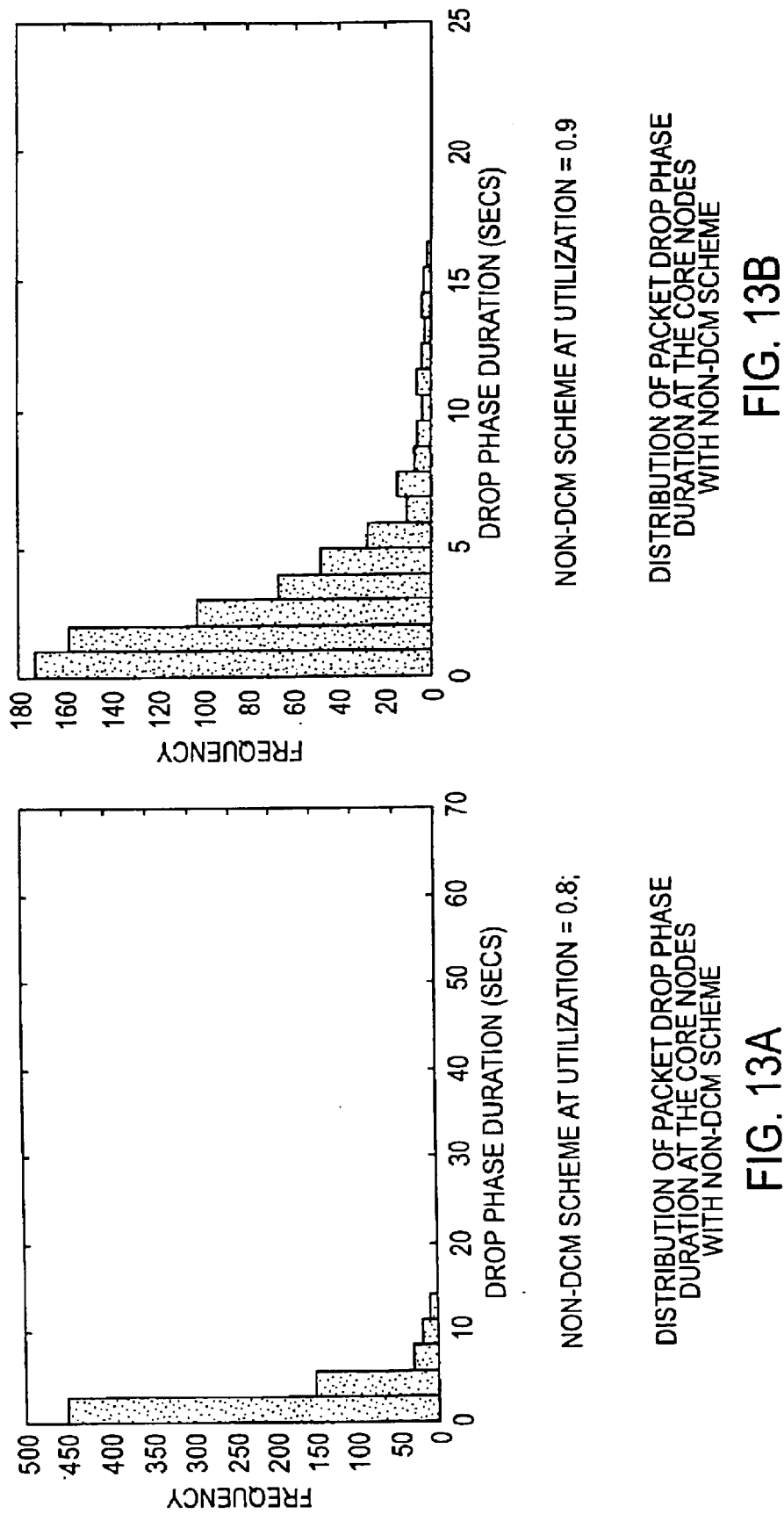

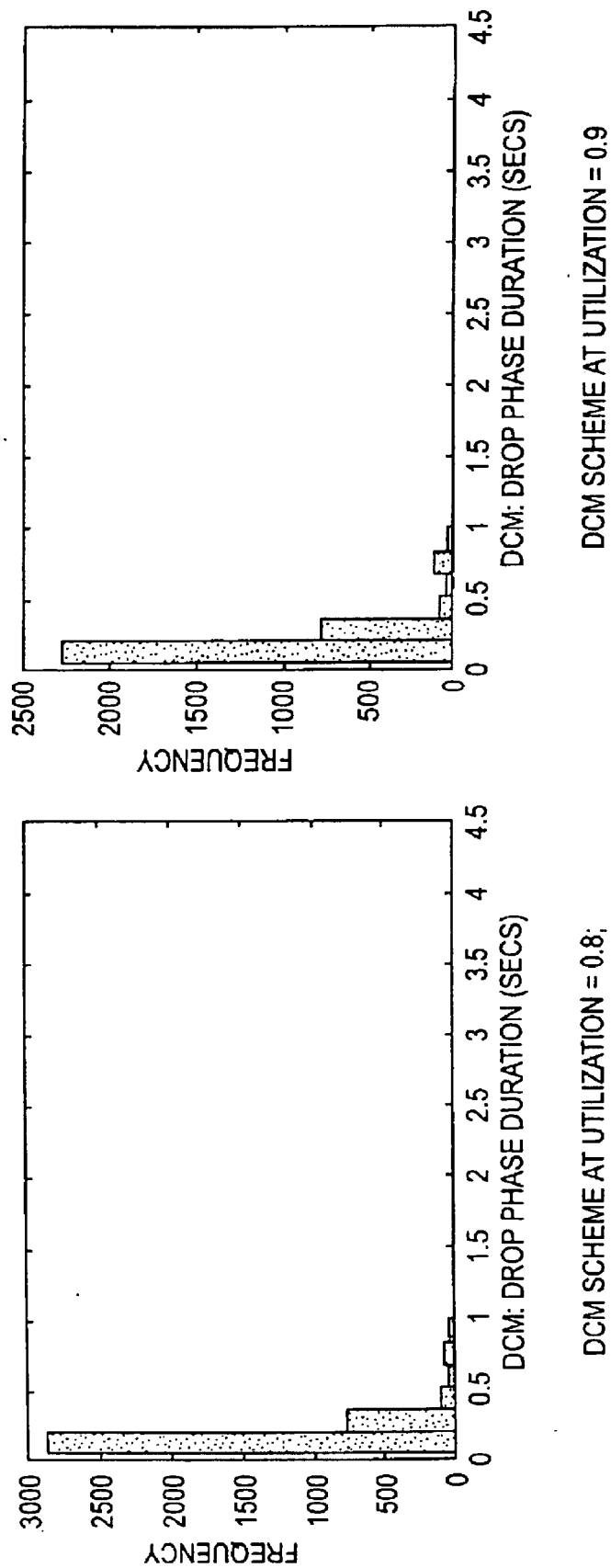

(a) packet loss % at core nodes;   (b) Total packet loss in the system (core +TBF)

PERFORMANCE OF THE DCM SCHEME WITH DOMAIN-RTT VARIATION

DOMAIN BASED CONGESTION MANAGEMENT

FIELD OF INVENTION

This invention is related to the field of congestion management schemes for controlling the flow of packets over the Internet.

BACKGROUND OF INVENTION

Potential congestion periods can occur for a number of possible reasons such as i) burstiness that is inherent in nodes and generated due to statistical multiplexing at nodes along a given path; and ii) non-adaptive greedy applications that may often cause (potential) congestion periods leading to severe packet loss conditions which affect other sessions that share network resources. Congestion avoidance and management schemes are essential for a better utilization of network resources.

Generally, congestion control schemes have two phases viz. i) early congestion detection and avoidance; and ii) a congestion management scheme that begins to operate once a congestion period occurs. Several congestion management schemes have been proposed so far. For example, binary feedback-based congestion management schemes rely on end sources to react to the congestion messages. Similarly, the current Internet relies on end-to-end congestion control mechanisms through either packet dropping or explicit congestion notification (ECN) by marking packets of a session. However, the end-to-end reaction to congestion is critically dependent on round trip time (RTT) between the end hosts.

Explicit rate management algorithms have also been proposed in the context of ATM. However, the explicit rate notification schemes that indicate the rates to which the individual traffic sources have to adapt are too complex to be implemented and require extensive processing at the core switches (or routers). They also need to generate periodic resource management (RM) cells that cause extra traffic. Furthermore, these schemes, in particular, require per-flow state maintenance that cannot be tailored easily to suit the heterogeneous Internet.

Core state-less fair queuing (CSFQ) has been proposed in order to eliminate the book keeping of each flow state at core routers. However, the key focus of CSFQ is on achieving fair bandwidth allocation. It relies on end hosts (traffic sources) to detect available bandwidth or congestion at the bottleneck nodes. The long round trip time between a given pair of source and destination nodes can lead to late reaction by the sources to the congestion notification. As a result, CSFQ may not be adequate in reducing packet loss.

Differentiated services (Diff-serv) over the Internet Protocol (IP) have been proposed to avoid maintaining state information of large number of flows at the core routers. In addition, Diff-serv moves the complexity of per-flow bandwidth management to intelligent edge routers. A Diff-serv cloud comprises i) a set of edge nodes known as ingress or egress nodes depending on the traffic flow direction that may maintain per-flow state and ii) a set of core nodes that do not maintain per-flow state information and carry a large number of aggregated flows (see FIG. 1).

Overview of Diff-serv architecture

The crux of Differentiated Services (DS) is that packets get different levels of service based on Type of Service (TOS) bits. These include i) traffic policing that leads to marking of the packets that are out of profile (violation of some traffic parameter as specified, e.g., peak-rate); ii) packet dropping and buffering strategies at various routers, also known as Per-Hop-Behaviors (PHBs); and iii) choice of an appropriate queue that maps to the type of service that was chosen by the application as indicated by the TOS bits. The flow or flow-aggregate information is maintained only at a few selected routers, such as edge routers. Thus, per-low/aggregate monitoring is avoided at core routers.

The PHBs that run on core routers can be adaptively tuned to compensate for the loose admission control at the edges where traffic of various classes are injected in to the network with a goal of predictable QoS. However, best-effort service still constitutes a considerable amount of net traffic. The allocation of the bandwidth available for best effort depends on the policy of individual Internet Service Providers (ISPs) and the service level agreements with other neighboring DS domains.

Currently there are two classes of services defined in the context of Diff-serv viz.: i) the Assured service (AS) and ii) Premium service (PS). They are respectively mapped onto Assured forwarding (AF) and Expedited forwarding (EF) per-hop-behaviors (PHBs). The AF PHB forwards packets according to their priorities. Thus, in the event of congestion, high priority packets receive better service than low priority packets. The EF PHB aims at reducing the queuing delays and emulates a leased line service from the end user's perspective.

Nevertheless, congestion management schemes are essential for good network utilization, even with priority-based packet handling schemes. Potential congestion periods can arise and it is difficult to assess the available bandwidth unless the core routers are enhanced with robust resource management schemes. Thus, each of the ingress nodes (unaware of an onset congestion period) can potentially inject more traffic into the core network of a Diff-serv domain. ECN has been proposed, however, the ECN requires end-hosts to interact and respond to the congestion notification.

Red

Active queue management algorithms, such as Random Early Detection (RED), can be employed in order to detect and avoid any potential network collapse due to congestion. Congestion detection can be based on buffer monitoring by setting a threshold value for buffer occupancy. However, simple buffer occupancy-based techniques may not be sufficient to handle bursty traffic because bursty traffic may temporarily lead to a buffer occupancy greater than the threshold value. This leads to frequent congestion avoidance/management triggering mechanisms. In contrast to simple buffer monitoring, the RED algorithm calculates an average queue size by using a low-pass filter with an exponential weighted moving average (EWMA). With a constant wq (0<wq<1), with the arrival of nth packet, the average queue size is given as follows $$avgQsize_n = (1-w_q) \cdot avgQsize_{n-1} + w_q \cdot currentQsize_n \quad (1)$$

The allowed range of the average queue size before packets are dropped determines the allowed burst sizes. Thus RED can accommodate traffic bursts unlike drop-tail FIFO-based queue thresholds, as the average queue size does not solely depend on the current queue size.

RED employs two queue thresholds, i.e., minth and maxth. Whenever the average queue is between the minth threshold value and the maxth threshold, the RED algorithm drops (or marks) packets randomly with certain probability $P_{drop}$ indicating an incipient congestion. If the average queue size exceeds the maxth, it drops all the packets until the average queue size falls below the maxth threshold. The probability of dropping is a function of average queue size and is given by $$P_{drop} = P_{max} \cdot \frac{(avgOsize - minth)}{(maxth - minth)} \quad (2)$$

where $P_{max}$ is the maximum probability of a packet drop. It is shown that the average queue size is substantially decreased with random packet dropping. This mitigates the tail-dropping effects and the associated synchronization of various TCP (application) back-offs (reduction in traffic transmission rate).

SUMMARY OF THE INVENTION

The present invention is a method and apparatus that uses thresholds for regulating congestion. It deterministically marks outgoing packets by setting a LCN bit(s) when an average queue size of a token bucket filter is between a minimum threshold and a feedback threshold. In addition, it probabilistically drops incoming packets and marks all outgoing packets when the average queue size is between a feedback threshold and a maximum threshold. Finally, all incoming packets are dropped when the average queue size equals or exceeds said maximum threshold.

In another preferred embodiment, the present invention is an apparatus and method for regulating traffic flow in a differentiated services network between nodes. First a core node detects congestion. Next, and egress node sends a congestion feedback notification message to at least one ingress node. In response, the ingress node reduces its traffic rate in proportion to the amount of traffic that it was injecting into the network when congestion was detected.

In still another preferred embodiment, the present invention comprises a method and apparatus for regulating the traffic rate at an ingress node by varying the number of tokens consumed by a data packet and transmitting the data packet if the number of tokens consumed by the packet is less than the available tokens.

In still another preferred embodiment, the present invention is an apparatus for controlling traffic flow in a differentiated services domain. It is comprised of a plurality of three types of nodes, ingress, egress and core nodes. Furthermore, each ingress node has a corresponding token bucket filter which is used to regulate the flow of data packets. The token bucket filter is comprised of a token generator and a bucket to hold at least one generated token.

BRIEF DESCRIPTION OF THE DRAWINGS

FIG. 2 illustrates the improvRED method.

FIG. 3 illustrates a simple 2-bit scheme used to indicate the onset of a congestion period at the core nodes.

FIG. 6(b) illustrates a Token Bucket Filter-based congestion management method used with ingress nodes.

FIG. 10 shows the performance of the DCM method vs. non-feedback based congestion control.

FIG. 11 illustrates the delay performance of the DCM method.

FIGS. 13(a) and 13(b) illustrate the distribution of congestion periods for a non-DCM method at the core node.

FIGS. 14(a) and 14(b) illustrate the drop phase duration for the DCM method for the utilization factors 0.8 and 0.9 respectively.

DETAILED DESCRIPTION OF THE INVENTION

Figure 1:
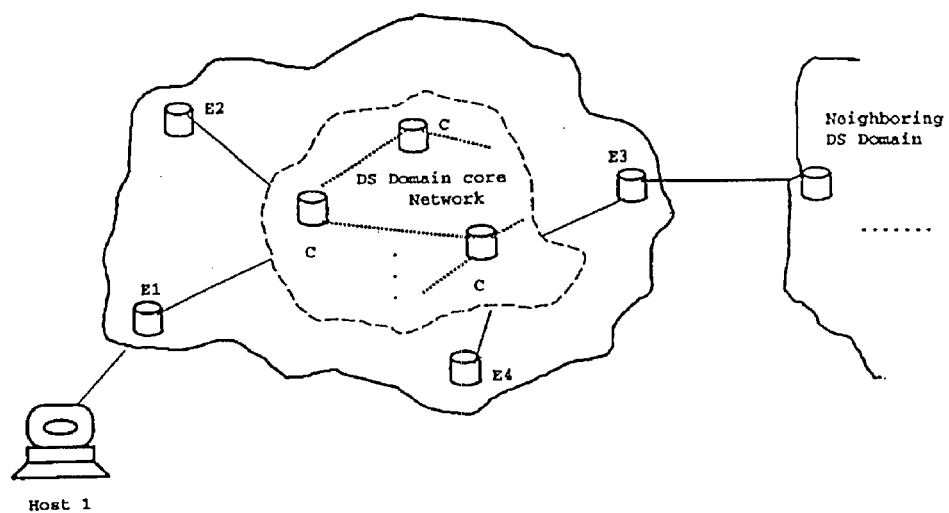
FIG. 1 contains the architecture of a Diff-serv domain.

The present invention is a feedback-based congestion control for a Diff-serv domain called Domain-based Congestion Management (DCM). One improvement it has over existing congestion control schemes is the advantage of shorter RTTs between a given pair of ingress/egress nodes of a Diff-serv domain. This is in contrast to the long end-to-end RTTs of existing congestion control schemes that invariably result in large latency of reaction to transient congestion periods. In addition, the present invention is not complex and requires no flow state maintenance at the core routers. Therefore, it can react quickly to transient congestion periods that occur locally within a Diff-serv cloud. Furthermore, shorter RTTs between a given pair of ingress/egress nodes can lead to faster detection and better utilization of the transient available bandwidth in the core Diff-serv domain.

The present invention improves upon the Random Early Detection (RED) and explicit congestion notification mechanisms to handle best-effort traffic. The DCM scheme is based on an improvement to the RED scheme (improvRED) of low complexity running on the core routers and an adaptive Token Bucket Filter (TBF)-based traffic regulation at the ingress nodes. It is a method and apparatus that allows all the ingress nodes (I) to share available bandwidth and adjust their rates of traffic injection such that the average congestion periods are reduced inside the Diff-serv domain. This leads to an overall improvement in utilization.

The DCM scheme is a distributed congestion control algorithm that runs on each of the ingress nodes. On the one hand, it helps the ingress nodes to avoid packet loss during congestion periods and, on the other hand, detects available bandwidth during congestion-free periods. In addition, the RED mechanism is improved to distinguish between an onset of a likely congestion period (marking phase) and a persistent congestion period that invariably incurs packet drops (dropping phase).

Feedback, in the form of a Local Congestion Notification (LCN) message (or message), is used to notify the ingress (or input) nodes (I) of a likely onset of a congestion (free) period. (In a preferred embodiment, the Local Congestion Notification message is an LCN bit(s) set in a data packet). In addition, an associated feedback control loop is introduced into the DCM scheme. Upon detecting the LCN bit set by any of the congested core nodes (C), egress (or output) nodes (E) shall report to corresponding ingress nodes (I) about the onset of a congestion period. The ingress nodes, as a result, shall respond to LCN messages. The LCN messages are used to indicate the congestion state at the relevant core routers, based on the average queue size at their TBFs.

The average queue size at the end of an adaptation interval (set to RTT) associated with a given pair of ingress/egress nodes (I/E) is used as a measure of demand for network bandwidth at the underlying ingress nodes (I). However, traffic rates associated with each ingress node (I) shall be varied in proportion to the amount of traffic each ingress node (I) is injecting at the onset of congestion. During the congestion management period, the ingress node (I) that injected more traffic at the time of an onset congestion, shall be responsible for a greater reduction in transmission rates during congestion recovery period. This leads to a fair resource utilization among ingress nodes (I).

The Domain-based Congestion Management Method

The DCM scheme comprises three main features: use of a improvRED method and apparatus for congestion detection at the core nodes or routers (C), congestion feedback in the form of LCN bits and use of token bucket filters (TBF) to regulate traffic at ingress nodes (I).

Improved RED

Random probabilistic dropping/marking of packets affects individual sessions proportional to their traffic rates. In existing congestion control schemes, egress nodes can not estimate the degree of congestion at a bottleneck core router from the ECN bits of the packets. Yet, it would be beneficial if the egress nodes (E) are able to detect a potential onset of congestion period so as to minimize packet losses and to delay or prevent a corresponding congestion period. Therefore, the present invention provides an early feedback so as to minimize packet losses and to delay or prevent a corresponding congestion period. The DCM scheme introduces an improved RED, called improvRED, that basically improves the original RED to provide feedback control.

In addition, an additional threshold, FeedbackThreshold (or Feedback), is introduced in the present invention. It takes a value between the minth (or minimum) and the maxth (or maximum) thresholds. The improvRED will be under a deterministically rather than probabilistically marking phase whenever the average queue size is greater than minth and less than FeedbackThreshold. During this phase, all outgoing packets are marked appropriately to indicate a potential onset of a congestion period and involves no packet drops 130.

When the average queue size is equal to or greater than FeedbackThreshold, but less than maxth, packets are dropped probabilistically 140 and all the outgoing packets are marked appropriately to denote the dropping phase 150. Both the marking and dropping phases are considered as indicators of potential congestion state at core nodes. These phases are experienced by the core nodes (C) to varying degrees as a result of the following condition (for an onset of a congestion period)

$$\Sigma IR^j(t) > R_{cong} \quad (3)$$

where $IR^j$ (t) denotes the incoming traffic rate at the congested node associated with an ingress node (I)j at time t and $R_{cong}$ is the service rate (link capacity) of the corresponding congested core node (C). Condition 3 is a necessary condition to drive the core node to a potential congested state through queue build-ups. As a result of the above condition the underlying core node (C) shall be in either of the drop/mark phase for short durations until the DCM scheme regulates the traffic such that the congested node is brought back to a congestion-free state. (The state where the average queue size is less than minth is referred to as a congestion free state). When the average queue size is greater than maxth, all incoming packets are dropped 160.

The improvement behind the introduction of a Feedback-Threshold is to avoid packet drops before any congestion control schemes ply in. The improvRED method is illustrated in the FIG. 2.

In order to indicate the onset of a congestion period at the core nodes (C), feedback in the form of a simple 2-bit scheme is proposed that is depicted in FIG. 3. The bits (bit1, bit2) serve as a notification to the egress nodes (E) of a specific congestion state in the Diff-serv domain. (The bits are set by the core nodes (C)). The egress nodes (E) shall appropriately notify corresponding ingress nodes (I) of the potential congestion at the core nodes (C).

The details of the integration of the 2 bit-scheme with the last two bits of the differentiated service code point (DSCP) byte follows. (It is assumed that an LCN bit is available that is reset at every ingress node (I) and core nodes (C) can set it whenever they are congested).

LCN Message

Figure 4:
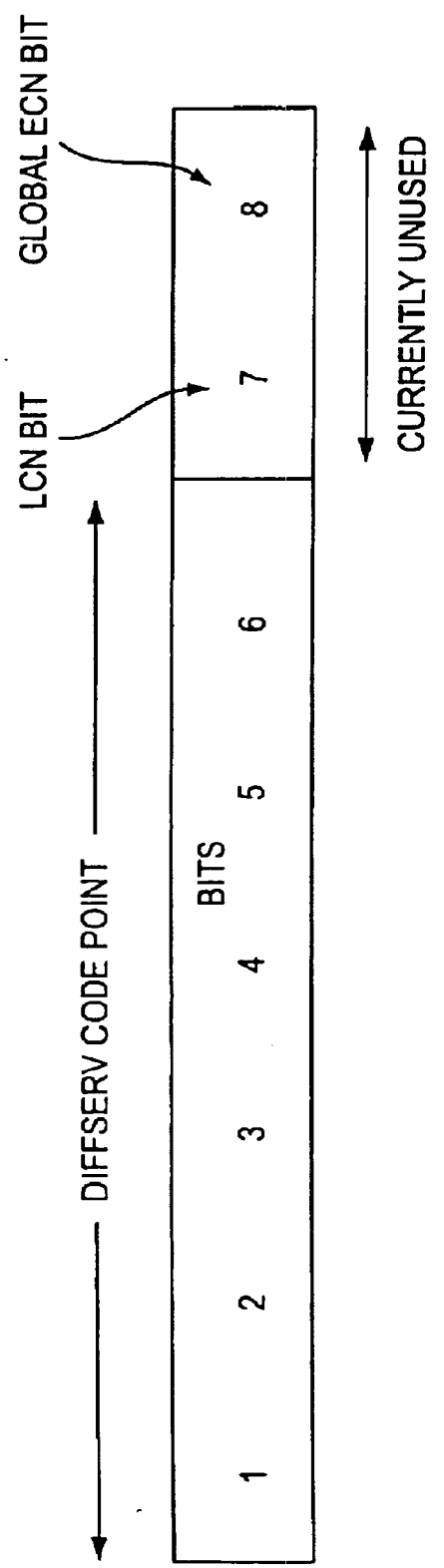
FIG. 4 is the definition of DSCP byte.

As discussed above, feedback, in the form of a Local Congestion Notification (LCN) bit or bits, is used notify the ingress nodes (I) of a likely onset of congestion period. The IP (Internet protocol) provides the Type of Service (TOS) byte in the IP packets that can be used for explicit classification and the type of treatment (priority) the packet should receive at the intermediate routers. The TOS byte has been redefined as differentiated services code point (DSCP) byte in the context of Diff-serv. The definition of DSCP byte is described in K. Nichols, S. Blake, F. Baker, and D. Black, Definition of the Differentiated Services Field (DS Field) in the Ipv4 and Ipv6 Headers (RFC 2474), work in progress, 1998, hereby incorporated by reference, and summarized in FIG. 4. The first leftmost 6 bits of the DSCP byte are intended to define various PHBs and their associated services. Bits 7 and 8 are used for explicit congestion notification (ECN).

Whenever a router detects congestion, it sets the ECN bit (bit 8) of the DSCP byte so that the receiver can alert the source of the network congestion at an intermediate router. The source node, in turn, may respond to the ECN bit by adaptively decreasing the traffic transmission rate. This mechanism is incorporated into many transportation protocols such as TCP and contributes to a healthy network that can avoid congestion-collapse.

Benefits of ECN include: i) avoidance of collapse of the network, and ii) flexibility of adapting to network conditions by the end applications. The Internet can provide an indication of an incipient congestion when using an active queue management scheme such as RED. In a preferred embodiment, the response to the ECN bit set packet by the sender is essentially the same as the response to a dropped packet, i.e., the sending node lowers its transmission rate. In addition, ECN can be incrementally deployed in both end-systems and routers.

When an ECN bit set packet is received by a router, the ECN bit is left unchanged and the packet is transmitted With existing congestion control schemes, when severe congestion has occurred and the router's queue is full, then the router drops a packet when a new packet arrives. However, such packet losses will become relatively infrequent under the improvRED congestion control mechanism because the explicit notification can also be implemented through marking packets rather than dropping them. In an adequately provisioned network in such an ECN-Capable environment, packet losses will then occur primarily during transients or in the presence of non-cooperating sources.

Bit 7 (FIG. 4) is used as the ECN-Capable transportation (ECT) layer bit in the present invention. In a preferred embodiment, it is targeted towards TCP. The ECT bit would be set by the data sender to indicate that the end-points of the transport protocol are ECN-capable. See K. K. Ramakrishnan, S. Floyd, B. Davie, A Proposal to Incorporate ECN in MPLS, Internet draft: draft-ietf-mpls-ecn00.txt, work in progress, 1999, hereby incorporated by reference. The ECN bit would be set by the router to indicate congestion to the end nodes. Routers that have a packet arriving at a full queue would drop the packet.

The proposed usage of the Bit 7 as an ECT bit in routers comes from recognizing that a packet, instead of being dropped, can, in fact, be instrumental in decreasing the traffic injected into the network by the corresponding transport protocol (such as TCP). However, this can be potentially misleading and dangerous, as misbehaving sources (transport protocols) can set this bit and maintain/increase the current traffic rate even though the ECN bit is set. However, one can look at the protocol field in the IP packet and determine the nature of the transportation whether it is adaptive or not.

A uniform numbering system can be evolved for such purpose. For example, one can allocate protocol numbers with less than, say 512, for the adaptive, ECN-capable transmission protocols and above 512 for non-adaptive/ECN-capable protocols. This facilities having a meaningful protocol number allocation and avoids the consumption of extra bits in the IP packet.

Thus, in a preferred embodiment, bit 7 (FIG. 4) can be used as a Lacal Congestion Notification (LCN) bit. Using bit 7 as the LCN bit does not preclude normal ECN operations, and in fact, the global ECN bit can be set at the egress nodes (or egress routers) (E) depending on the LCN bit and the individual characteristics such as adaptability of the incoming (ECN-aware) flows.

The LCN bit assumes only local importance with respect to the Diff-serv domains. It is reset at the ingress node (or ingress router) (I) and set at any of the routers within the same Diff-serv domain that detects an incipient congestion. The LCN bit is intended to convey congestion local to the Diff-serv domain to an egress node (E). The egress node (E) can then alert the corresponding ingress node (I) of the potential congestion. The ingress node (I), in turn, can take appropriate measures on notification of the local congestion. Thus, the 2-bit scheme described in above and shown in FIG. 3 can be integrated with currently unused bits of the DSCP byte.

In a preferred embodiment, the egress nodes (E) upon detecting packets with (bit, bit2) marked as either (1,0) or (1,1) inform the corresponding ingress nodes (I) the first time they detect such a marking. In addition, they report the first time of local domain congestion clearance whenever they see the marking of either (0,0) or (0,1) (i.e., local domain congestion clearance) after they previously notified a congestion period to the corresponding ingress nodes (I). The packet marking can be efficiently implemented at the output port without going through the entire queue every time at the core nodes (or core routers) (C). The feedback-based local congestion control algorithm that utilizes the LCN scheme is described next.

Feedback Control

The feedback method of the present invention operates as follows. The available bandwidth in the core Diff-serv network is subject to transient congestion periods. As a result, it is difficult to get a good estimate of the available bandwidth. Each ingress node (I), unaware of the exact amount of available bandwidth and in order to achieve higher network bandwidth utilization, injects its traffic (in the form of data packets) until a congestion feedback notification is received from a corresponding egress node (E). The egress node (E) notifies all the ingress nodes (I) that share the congested bottleneck link. The ingress nodes (I) immediately respond to the congestion notification by appropriately regulating their respective traffic rates (i.e., the amount of packets they inject into the Diff-serv network). Thus, the ingress nodes (I) cut back their transmission rates upon local congestion notification.

Once the congestion is cleared at the bottleneck, the egress node (E) informs all the ingress nodes (I) that were previously notified about the onset of a congestion period. However, each ingress node (I) shall increment the rates at random times. This avoids correlation/synchronization among the ingress nodes (I). When another transient congestion period occurs, the cycle repeats with another local congestion notification.

In the present invention, the egress nodes (E) identify the ingress nodes (I) that are to be informed of the onset/occurrence of a local congestion within the Diff-serv cloud. Route pinning enhances and ensures that consistent service provisioning is feasible, if at all. See R. Guerin, A. Orda, QoS-based Routing in networks with inaccurate information: Theory and algorithms, IEEE/ACM Trans., On Networking, June, 1999, hereby incorporated by reference. Route pinning is feasible either through a source routing IP option or some form of label mapping onto fixed paths between a given pair of ingress and egress (edge) routers (or nodes) (I,E) of a Diff-serv domain. It determines a path between a given pair of ingress (I) and egress nodes (E).

Label-based route pinning is one of the easiest ways for identifying the ingress points of the packets received at the egress node (E). A label mechanism for route pinning is a more attractive option because of its simplicity. Furthermore, it can be preconfigured by a network administration. A label, denoted by j, represents a node-tuple <ingress, i1 .. in , egress >, where in denotes a node in the corresponding route within the Diff-serv domain (equivalent to a virtual circuit). A label that is attached to the incoming packets at the ingress node (I) ensures that the packet is switched/forwarded through a pre-selected route between a given pair-wise edges of a Diff-serv domain. Many individual flows between a given pair of ingress (I) and egress (E) nodes can be mapped onto same label. Labels have only local significance with respect to a given Diff-serv domain.

Traffic regulation at ingress nodes depends on 1) the demand and 2) the congestion state of the core domain which is determined by the ingress nodes (I) from LCN messages from corresponding egress nodes (E) is described next.

Token Bucket Filter (TBF)-based Rate Control Method

Figure 5A:
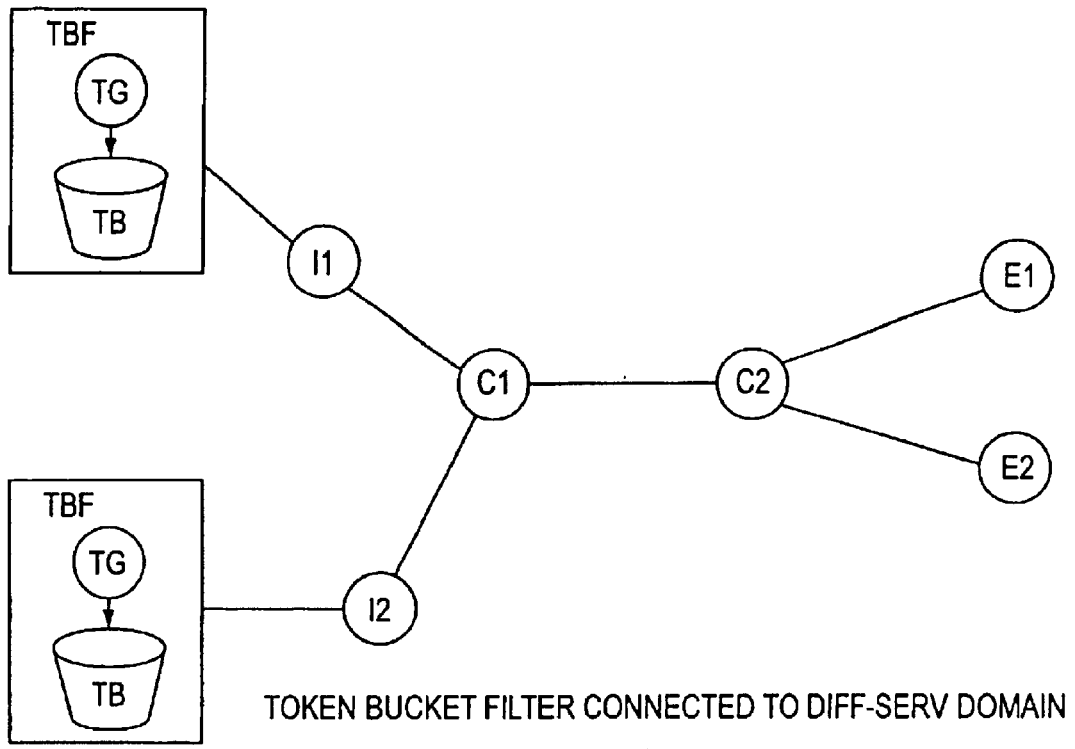
FIG. 5(a) illustrates a token bucket filter connected to a Diff-serv domain.
Figure 5B:
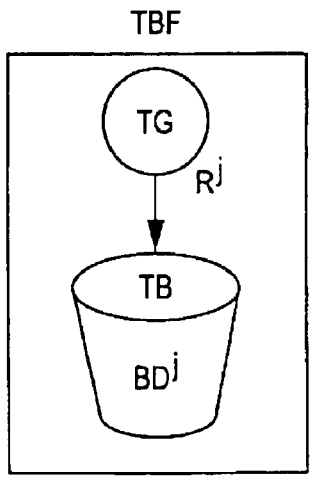
FIG. 5(b) illustrates the components of a token bucket filter.

A token bucket-based rate control method is widely employed as a traffic policer/conditioner and was originally proposed in J. Turner, New Directions in Communications, IEEE Communications Mag., October 1986, hereby incorporated by reference. A token bucket filter (TBF) consists of two components viz., i) a token generator (TG) and ii) a token bucket (TB) to hold the generated tokens. (see FIGS. 5(a) and 5(b)). It can be characterized as ($R^j$, $BD^j$) where $R^j$ denotes the token generation rate and $BD^j$ denotes the bucket depth. Each incoming packet at a TBF consumes (or deletes) tokens from the bucket (TB) if available when it is transmitted by the associated ingress node (I). Generally, the number of tokens consumed is equal to the packet size (Pkt_size) measured, appropriately in terms of bits.

In the present invention, the amount of traffic (or data packets) injected into the core of the Diff-serv domain is controlled by a token bucket (TB) at each of the ingress nodes (I). The TBF-based rate control method disclosed in the present invention is used to vary the number of tokens consumed by data of unit size that is represented by PktWt$^j$ 200. Therefore the number of tokens consumed by a packet of size Pkt_size is Pkt_size*PktWt$^j$. The TBF at an ingress node (I) shall transmit a packet if the following modified condition is satisfied. This condition essentially regulates the outgoing traffic rate.

$$Pkt\_size * PktWt^j <= \text{available tokens in the bucket} \quad (4) \ 210$$

Figure 6A:
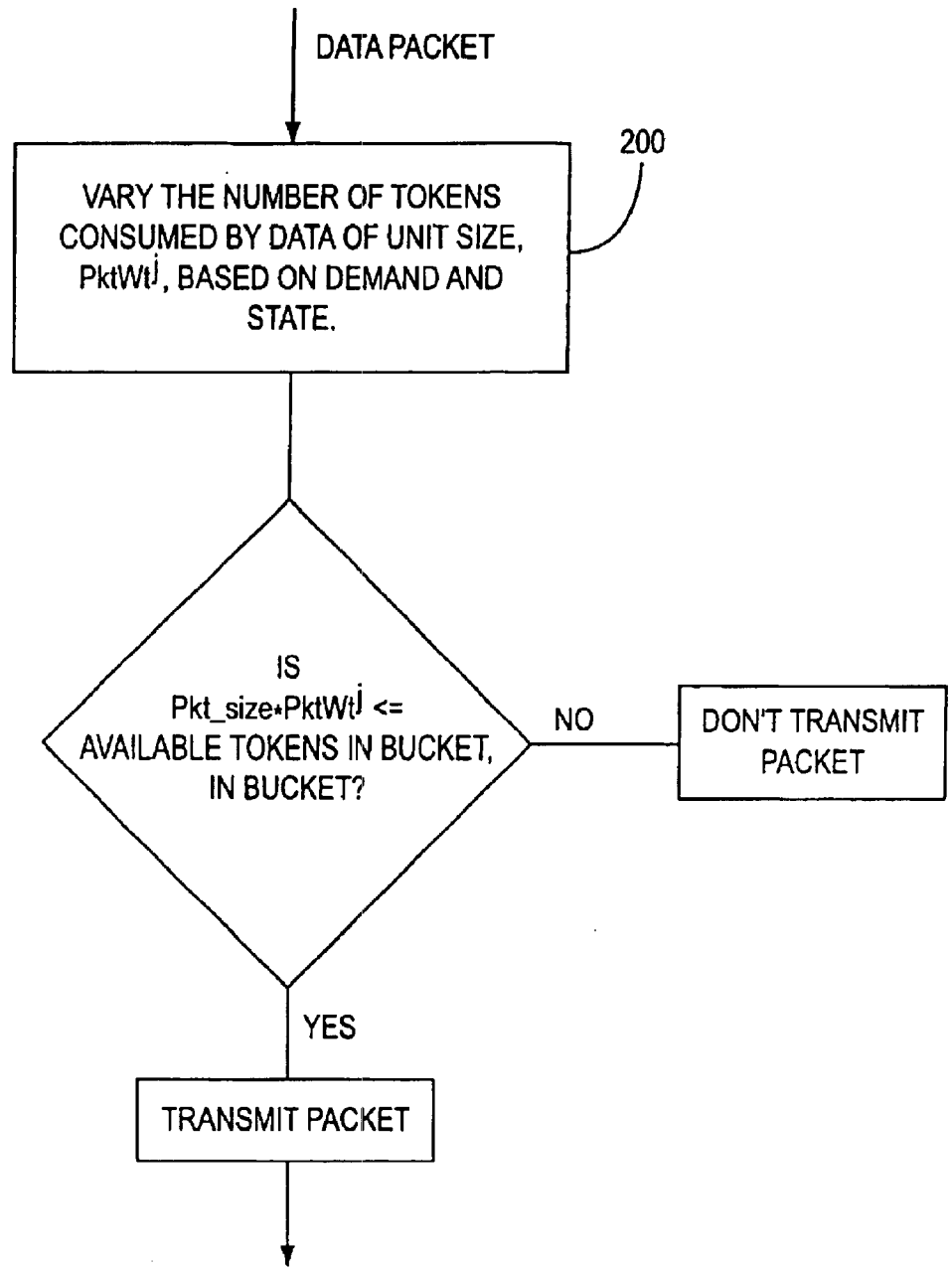
FIG. 6(a) is a flowchart for the Token Bucket Filter-based rate control method.

In a preferred embodiment, the PktWt$^j$ depends on two factors, viz., i) demand for network bandwidth at an ingress node (I) (or demand), and ii) state of the core domain with respect to congestion experienced at any of the nodes along the route associated with the label j. The demand for network bandwidth at an ingress node (I) is indicated by the average queue size at the TBF. The average queue size at a TBF is estimated according to equation 1, as in the case of RED. If the average queue size at a TBF is greater than a threshold (or demand threshold or threshold value) denoted by DemandThresh$^j$, then it is inferred that the bandwidth demand (or demand) is high, else, the demand is said to be low. The TBF-based traffic regulation at ingress nodes responding to local congestion notifications is described in FIGS. 6a and 6b.

During congestion-free periods, depending on the demand for bandwidth at a given ingress node (TBF), the PktWt$^j$ is varied. If the demand for bandwidth increases monotonically, the PktWt$^j$ decreases monotonically 220. Thereby a packet of unit size consumes less tokens (=Pkt_size*PktWt$^j$) than when PktWt$^j$ is ideally/originally 1. If the average queue size is greater than the threshold value DemandThresh$^j$, then the PktWt$^j$ is further allowed to decrease so that in the next round trip cycle, more packets are allowed to pass the TBF and enter the core Diff-serv domain 230. However, during either low demand or congestion-free RTT cycles, the PktWt$^j$ approaches 1.

Congestion Notification

Upon the receipt of a congestion notification by the ingress nodes, the PktW$^j$ is increased accordingly to the current value of PktWt$^j$ at the time of the notification 240. The lower the PktWt$^j$ at the time of congestion notification, the higher the PktWt$^j$ will be for the next RTT cycles during congestion control 250. (Therefore, the value of PktWt$^j$ is varied in proportion to its current value at the time of notification). Until a congestion clearance notification is received (it is assumed that feedback control messages are never lost), the PkWt$^j$ is maintained at a value greater than or equal to unity. Thus, a more aggressive ingress node (I) that previously had a high demand for network bandwidth shall drive the PktWt$^j$ to a small value during subsequent congestion-free periods. If the demand is persistent, then it is more likely that the PktWt$^j$ is well below the ideal/original value of 1. Hence, at the time of congestion notification the nodes with smaller PktW$^j$ s shall decrease the traffic rate more than those with smaller demand. The method is graphically depicted in FIG. 7.

Figure 7:
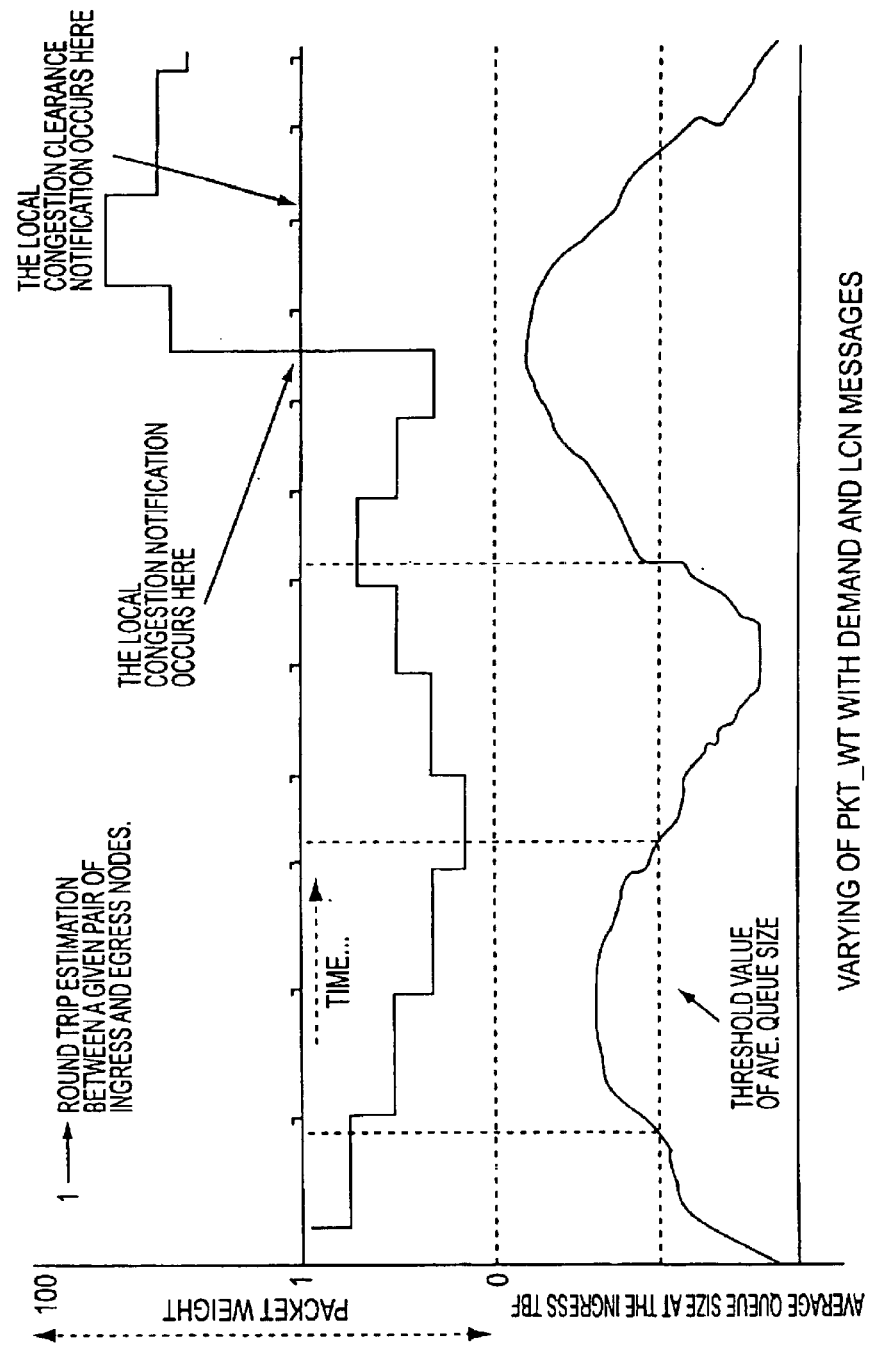
FIG. 7 illustrates the varying of packet weight with demand and LCN messages.
Figure 8:
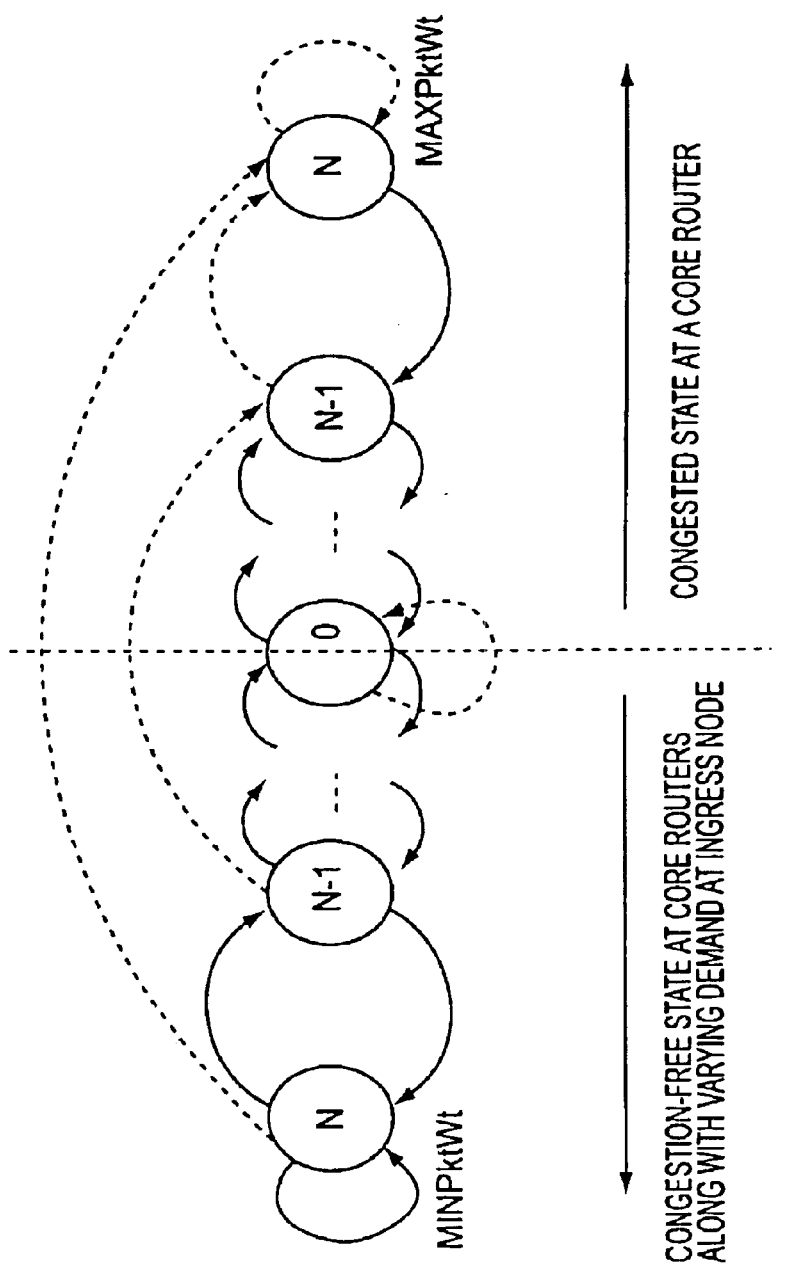
FIG. 8 depicts a possible discrete state implementation of the algorithm in FIG. 7.

FIG. 8 depicts a possible discrete state implementation of the method disclosed in FIG. 7 where PktWt$^j$ has (2N+1) states, N∈I$^+$. The middle state (state 0) corresponds to the state where PktWt$^j$ equals 1. Any state n (n∈{1 .. N}) to the left (right) of the state 0 is the state where its PktWt$^j$ is in the n levels lower (higher) than level 0 (PktWt$^j$=1), i.e. its PktWt$^j$<(>)1. The extreme end states have PktWt$^j$ assuming a value of either minPktW$^j$ or maxPktW$^j$ respectively. The states to the left of the middle state (PktWt$^j$=1) have their PktWt$^j$ in the range [minPktWt$^j$, 1) and, similarly, the states on the right have a PktWt$^j$ assuming the values between (1, maxPktWt$^j$]. The dotted lines correspond to transitions in response to LCNs of the onset of congestion periods, while the solid lines denote the transitions in response to demand at ingress nodes (I) and the state of congestion inside the core domain. The mapping of states on the left side to the states on the right of middle state in response to LCNs is a uniform mapping (i.e., a mapping from [minPktWt$^j$, 1) on to [maxPktWt$^j$, 1)) (c.f. FIG. 6, at the congestion notification time).

Configuration

Since each of traffic aggregates associated with a label j is treated with equal priority, the configuration of the TBF parameters is based on max-min fairness. See D. Bertsekas and R. Gallager, Data Networks, pp. 527–528, Prentice Hall, 1992, hereby incorporated by reference. It is based on the assumption that the Diff-serv topology is static over the operating period. Therefore, if the topology changes, the relevant parameters can be recomputed (reconfigured) easily.

Each of the TBFs at a given ingress node (I) and the associated label j that denotes a unique route to any egress node (E) has three basic parameters to be configured, viz., i)R$^j$, ii) BD$^j$, and iii) the range of PktWt$^j$ (where R$^j$ denotes the token generation rate and BD$^j$ denotes the bucket depth or size). Let R$^j_{bn}$ and B$^j_{bn}$ denote the max-min fair share of bandwidth and buffer size respectively at a bottleneck (bn) core node. The R$^j_{bn}$ and B$^j_{bn}$ are calculated according to max-min fair resource algorithm by considering bandwidth and buffer size as independent resources shared by traffic aggregates corresponding to unique labels (j)s. Without much loss of generality, the buffers at all core nodes (C) inside a core domain are assumed to be of same magnitude. This implies that rate bottleneck of traffic aggregate is the same as buffer bottleneck (i.e., the same bn). Thus, the TBF denoted by (R$^j$, BD$^j$) has the following as initial configuration values.

$$R^j = R^j_{bn} \quad (5)$$

$$BD^j = B^j_{bn} \quad (6)$$

Furthermore, the initial value of PktWt$^j$ is set to 1.

The values R$^j$ and BD$^j$ of a TBF do not change, but the PktWt$^j$ that determines the rate of consumption of tokens from token bucket shall vary according to two factors: 1) demand for bandwidth and 2) congestion state inside the core of a Diff-serv domain. In order to determine the range of PktWt$^j$ for each of the TBFs, denoted by [minPktWt$^j$, maxPktWt$^j$)], the effect of changing PktWt on the outgoing traffic from a TBF denoted by (R$^j$, BD$^j$) is examined. (The maximum transmission unit (MTU) along a route corresponding to label j is a given).

Range of Values (min, max) for PktWt j)

In order to be able to transmit a packet when PktWt$^j$ assumes the value maxPktWt$^j$, the following should be satisfied $$maxPktWt^j * MTU <= BD^j \quad (7)$$

The maxPktWt$^j$ is determined by the following equation:

$$\max PktWt^j = \frac{BD^j}{MTU} \quad (8)$$

If the condition (Eq. 7) is violated, then Head-of-line (HOL) problem can occur since a front packet of MTU size in the queue cannot find enough tokens for its transmission. The HOL can lead to blockage of all packets waiting at the TBF queue even though the packets are eligible for transmission irrespective of token generation rate $R^j$. The transmission rate decreases to $R^j/(\text{maxPktWt}^j)$ when $\text{PktWt}^j$ assumes the $\text{maxPkwt}^j$.

In order to limit the queue and packet loss due to buffer overflow at an ingress TBF during congestion periods at the core, it is desirable to have a minimum transmission rate (MTR) at each of the ingress nodes (with MTR less than $R^j$). The $MTR^j$ is the minimum data buffer drain rate from ingress queue. The $MTR^j$ can be determined from the following equations:

$$(R^j_{peak} - MTR^j)*T_{burst} = B^j \quad (9)$$

$$MTR^j < R^j \quad (10)$$

where $R^j_{peak}$ is a peak arrival rate of incoming traffic, $T_{burst}$ is the average burst duration, and $B^j$ is the data buffer of the ingress queue. Thus, $\text{maxPktWt}^j$ is finally calculated as $$\text{max}PktWt^j = \min\left\{\frac{BD^j}{MTU}; \frac{R^j}{MTR^j}\right\} \quad (11)$$

Note that the maximum delay at the ingress queue is given by $$\frac{B^j}{MTR^j}.$$

On the other hand, $\text{minPktWt}^j$ is determined based on an optimistic condition that the ingress node (I), when active, has the whole buffer of the intermediate bottleneck node (bn) at its disposal. That is, the maximum amount of data that can be injected at one time into the core domain when the token bucket (TB) is full is bounded by the buffer size of the intermediate bottleneck node (bn). Thus the $\text{minPktWt}^j$ that determine the maximum amount of data is given by:

$$\text{min}PktWt^j = \frac{BD^j}{B_{bn}}; \frac{R^j}{R_{bn}} \quad (12)$$

Note that the second equality comes from the fact that a max-min fair share is deployed in the domain. In addition, it is assumed that the max-min fair share of bandwidth at the buffer-bottleneck node (bbn) is the same as the bandwidth at the bottleneck node (bn). As the $PktWt^j$ approaches the $\text{minPktWt}^j$, the maximum transmission rate at the TBF approaches $R_{bn}$.

The $\text{demandThresh}^j$ dictates how aggressively the available bandwidth is sought after. There is a downside to choosing either a small value for $\text{demandThresh}^j$ or a large value for $\text{demandThresh}^j$. A small value can lead to frequent $PktWt^j$ changes towards a value smaller than 1. This is due to the fact that it is highly likely that the average queue size at the corresponding TBF exceeds the $\text{demandThresh}^j$.

On the other hand, if the $\text{demandThresh}^j$ is set to a large value, then the transient available bandwidth is not detected in a timely manner. Moreover, waiting for a large queue buildup at the TBF can lead to larger bursts injected in to the core domain, thereby increasing the packet loss probability at core nodes (C). (However, this limited by the choice of $\text{minPktWt}^j$).

Based on the above observations, the $\text{demandThresh}^j$ is set to a value $$\text{demandThresh}^j <= \frac{BD^j}{2} \quad (13)$$

It should be noted that, in the DCM method during congestion periods one can simultaneously reduce both burst size and the rate of packet transmission into the core domain by making $PktWt^j$ greater than 1. On the other hand, the DCM method can take advantage of the bounded increase transmission rates during congestion-free periods.

The following proposition demonstrates the effectiveness of the DCM method in recovering the Diff-serv domain from a congestion state.

Proposition: In the Diff-serv domain with the Domain-based Control Management (DCM) method, none of the core nodes will be in a congested state indefinitely, if the feedback messages are never lost.

Proof: By contradiction. Assume that there exists at least one of the core nodes (C) in a congested state indefinitely. Also assume that the feedback messages are never lost. Let J denote the set of labels (equivalently, ingress nodes) that share the congested core node (C) under consideration with bandwidth $R_{cong}$. Note that by max-min fair share allocation (configuration) of $R^j$ s, we have $\Sigma_{j \in J} R^j <= R_{cong}$. Let t1 be the time that an ingress node (I) starts becoming congested. In order for the node to be congested, the condition $\Sigma_{j \in J} OR^j(t) > R_{cong} \forall t > t_1$ should hold. $OR^j(t)$ denotes the outgoing packet rate at ingress node TBF associated with label j, where $OR^j(t) = R^j/(PktWt^j(t))$. From t1, all the packets shall be marked with the LCN bit at the congested node. Since feedback messages are never lost, each of the ingress nodes (I) will be notified by egress nodes (E), based on the labels (js) attached to the packets, after t1. Let t2 (>t1) be the time that the first corresponding ingress node(s) (I) receives the feedback message. Then the ingress node (I) with $PktWt^j(t) < 1 (t2 <= t)$ by the time it receives the feedback messages will adjust the $PktWt^j$ s such that $PktWt^j(t) > 1$ in response to LCN feedback messages. Meanwhile the ingress node (I) with $PktWt^j(t) > 1 (t_1 <= t)$ will increase $PktWt^j$ to the next higher level of $PktWt^j$ value. Therefore its $PktWt^j(t)$ is still greater than one. No change in $PktWt^j$ for the ingress nodes (I) with $PktWt^j(t) = 1$. Thus, the total sum of the transmission rates at the ingress nodes (I) that share the congested core node (C) will be $\Sigma_{j \in J} OR^j(t') < R_{cong}$ for some $t' > t_2$. This condition prevails until the average queue size decays back to a value below minth, such that the outgoing packets are marked congestion-free (i.e., LCN bit assumes the value 0). The congested core node (C) is therefore pushed back to a congestion-free state, and this contradicts the assumption.

The above proposition also demonstrates the robustness of the DCM scheme in controlling congestion. That is, the DCM scheme continues to operate properly even under the presence of non-adaptive, greedy UDP traffic sources, since the method relies on the network elements (edge nodes) to adjust traffic into the domain rather than rest responsibility on the end applications. In the current IP network, the adaptive flows have to compete with non-adaptive flows and therefore are at a disadvantage when some of the non-adaptive sources are aggressive in grabbing bandwidth. In the proposed scheme, such a drawback is completely eliminated, and the edge routers can appropriately take preventive measures based on per-flow fair share.

Simulation results

The following are some results of the proposed method. A Network Simulator (disclosed in the website wwwmash.cs.berkley.edu/ns/, hereby incorporated by reference) was employed for the simulations. Simulations were carried out based on the configuration shown in FIG. 9. The link between core routers C1 and C2 is associated with the improvRED queue that facilitates in setting the LCN bit of out going packets whenever the average queue size exceeds FeedbackThreshold.

The size of minth and maxth of the improvRED are set to 30 and 200 packets respectively. The FeedbackThreshold is set to a value of 50. The buffer capacity of improvRED is set to 250 packets. The RTT between corresponding ingresslegress nodes nodes (i.e., (I1, E1), (I2, E2)) is assumed to be normally distributed, with an average of 30 ms with a variation of ±5 ms.

The aggregate traffic sources at both ingress nodes I1, I2 are modeled as Pareto on/off sources with an average burst time of 500 ms and burst rate is around 0.8 Mbps during on periods. The shape parameter ($\alpha$) of the Pareto distribution is set to 1.2. The choice of the Pareto distribution can be justified by its inherent properties such as long bursts and strong correlation between inter-arrival times of the packets. Packet sizes are fixed at 0.5 Kb.

Figure 9:
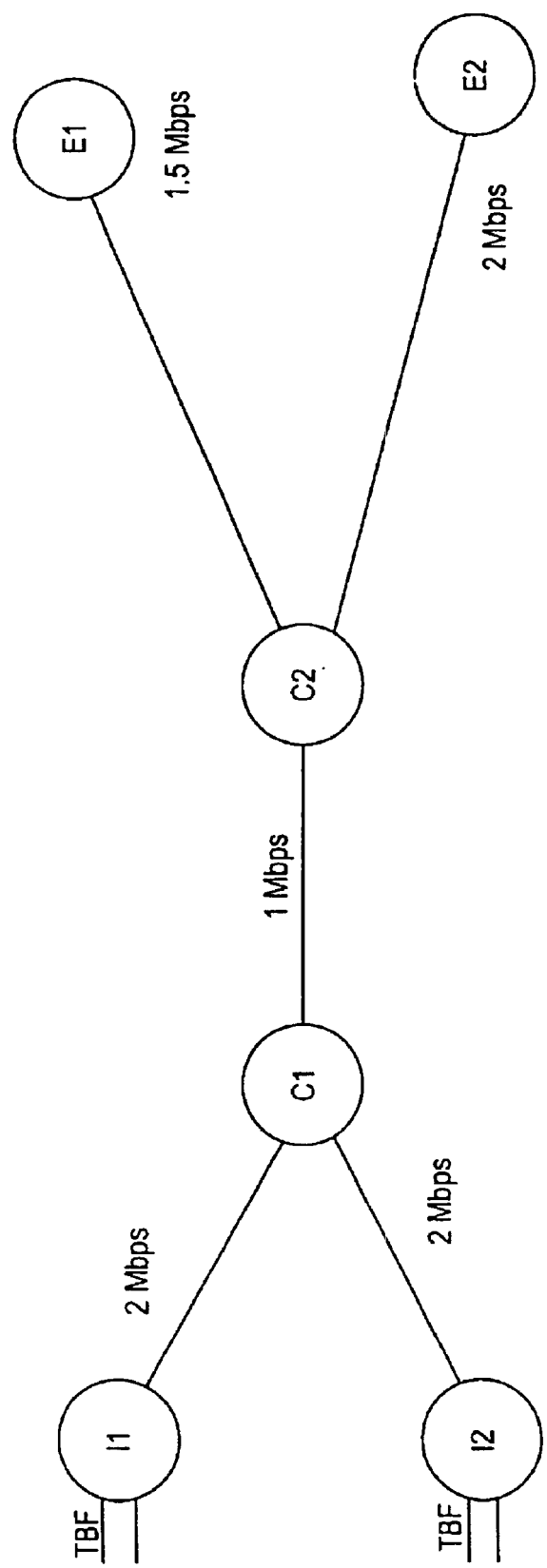
FIG. 9 depicts a simulation setup.

Each of the queues at the ingress TBFs is provided with a buffer of 350 packets. The DemandThresh at both ingress TBFs is set at 30 packets. Based on the topology for j=1,2, $R^j$ is set at 0.5 Mbps and $BD^j$ is set at 50 Kb, with $PktWt^j$ initially set to 1. The $minPktWt^j$ is estimated to be 0.5. The MTR is calculated from to 0.32 Mbps, thereby the $maxPktWt^j$ takes a value of 2.5. The N in FIG. 9, representing a number of level of PktWt adjustment and determining the total number of discrete states (2N+1) with uniform mapping, is set to 5. The utilization is defined as follows:

$$\text{Utilization} = \frac{\text{Sum of average incoming traffic rates at ingress TBFs}}{\text{Bottleneck link bandwidth}} \quad (14)$$

Several runs of simulations were carried out with a typical duration of 6000 secs. This is of several orders magnitude greater compared to RTTs between any given pair of edge (ingress/egress) nodes (I, E). Therefore, the dynamics of the proposed scheme may be well captured during this 6000 sees duration. Simulations with larger time yielded similar trends as indicated in the rest of this paper.

The table in FIG. 10 depicts the performance comparison of DCM method against the non-feedback-based congestion control with RED at core nodes, averaged over several simulation runs. The figures in the table in FIG. 10 demonstrate that there is a significant reduction in packet losses with DCM method over the non-DCM method, especially at higher utilization factors (above 0.6).

Furthermore, the DCM method is able to take advantage of the early congestion notification and regulate the inflow of traffic at the ingress TBFs into core domain resulting in a reduction of packet loss at core nodes (C). As the utilization factor is increased, the packet loss in the domain also increased. The total packet loss has two components, viz., i) packet loss at core nodes (C) and ii) packet loss at ingress TBF queues. Hence, as the utilization factor is increased, the demand at the ingress TBFs also increases correspondingly. This, in turn, results in a decrease in PktWt$^j$ s leading to higher injection of traffic into the core domain. This results in a slightly higher core packet loss as the utilization factor is increased. However, the overall packet loss at the core nodes (C) with DCM method is still limited to just (absolute) 3% up to a utilization factor of 1. This is a small penalty incurred due to the bandwidth hunting by the ingress nodes (I) with minimal support from the core nodes (C) (restricted to setting LCN bit during congested periods).

The total system packet loss (core+TBF) is consistently less than the corresponding packet loss in non-DCM method leading to a relative improvement by at least 30% in packet loss. Even under heavy-load regions (utilization >1), the packet loss is substantially lower in the case of DCM methods over the non DCM method by at least 25%, thereby demonstrating the robustness of the DCM method to withstand occasional heavy loads.

Next, the penalty incurred due to the traffic regulation at the ingress TBFs is evaluated. There are two types of penalties at ingress TBFs, viz., a) packet loss due to buffer overflow at ingress TBFs, and b) increase in average delay. There is a penalty due to buffer overflow at an ingress TBF that increases with input traffic as shown in column 4 of the table in FIG. 10. The DCM method is able to keep the packet loss at the core nodes almost under 3% and push packet loss due to the excess traffic that cannot be accommodated at the core nodes, back to the ingress TBFs. Thus, the input aggregated flows that aggressively sent traffic into the domain will be penalized more than the others with substantial packet loss at the ingress TBFs. This leads to fairness of the DCM method in congestion management. As a result, overall better utilization of core bandwidth is achieved, as is depicted in the last column of the table in FIG. 10 wherein an overall relative improvement in packet loss of 30% obtained using the DCM method over non-DCM method.

The other component of the penalty incurred at the ingress TBFs is the ingress queuing delay. Its statistics are given in the table in FIG. 11 for the DCM method. The average queuing delay incurred at ingress TBFs increases with an increase in utilization factor. During congestion periods, the outgoing rate falls back closer to MTR at each ingress nodes leading to an increase in average queuing delay at the ingress nodes (I). Thus, the gain in overall improvement in packet loss is at the expense of slight increase in the queuing delay incurred at ingress TBFs due to traffic regulation.

The DCM method effectively limits the packet loss at core domain to below 3%. In addition, the extra load that cannot be accommodated at bottleneck core node is either delayed or dropped at the ingress TBFs depending on buffer occupancy. This demonstrates that the DCM method can tolerate occasional high demands (utilization >1) on core bandwidth, and persistent demand for core bandwidth can lead to greater penalties at the ingress nodes (I), such as packet loss and increased average delay that is localized at the ingress TBFs.

Figure 12B:
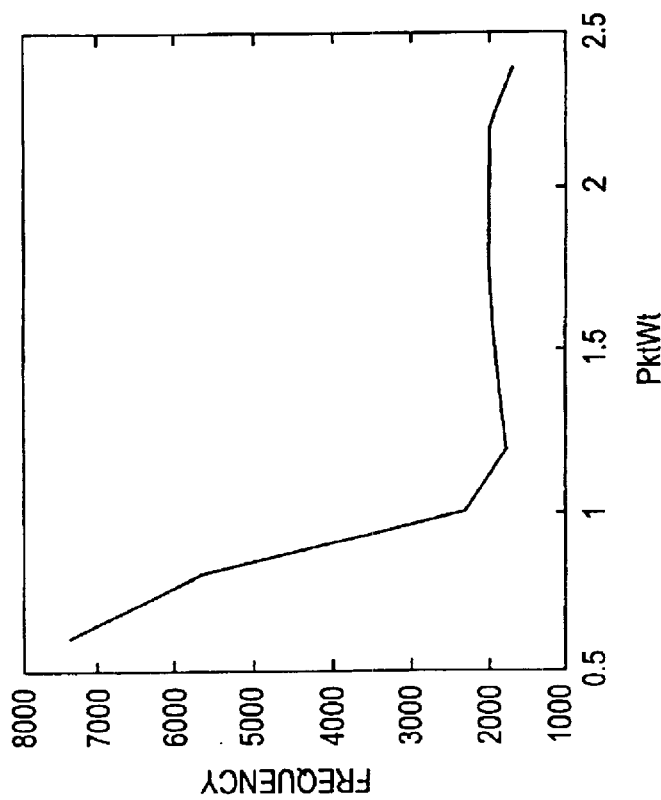
FIGS. 12(a) and 12(b) depicts a sample average queue size and the distribution of packet weight at an ingress Token Bucket Filter for a utilization factor of 0.8.
Figure 12A:
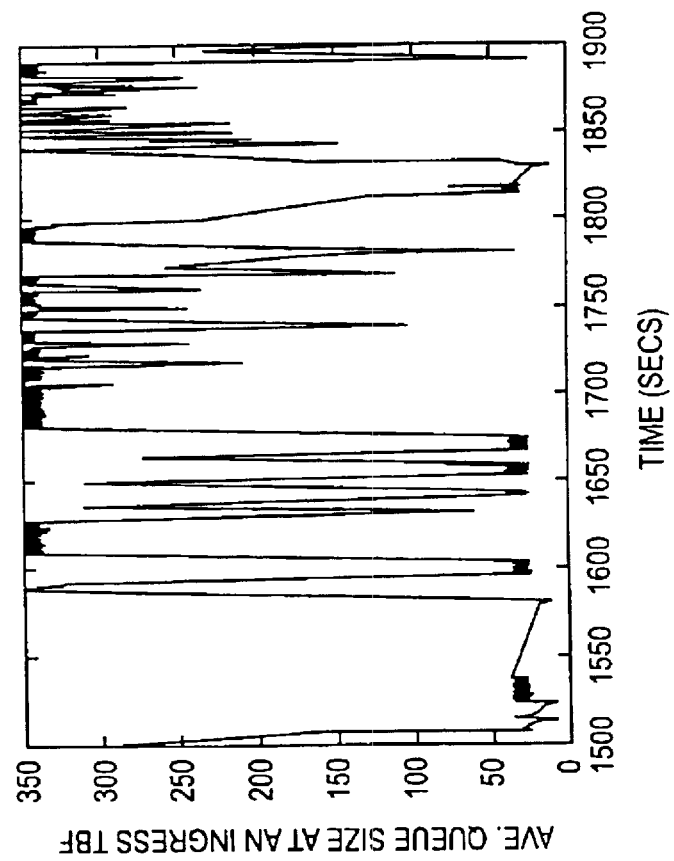

FIGS. 12(a) and 12(b) depicts a sample average queue size and the distribution of PktWt at an ingress TBF for a utilization factor of 0.8. Even though the demand at times is high, an ingress node is able to hunt the available bandwidth at the core in order to clear the backlog at the TBF queue. This is further confirmed by the distribution of PktWt$^j$ that shows that the TBF system has been mostly operating with PktWt$^j$ less than 1. Thus, the system is able to detect the available bandwidth and clear the local backlog with proper traffic regulation that results in less than 3% packet loss at core domain.

The distribution of congestion periods (packet dropping phase) for a non-DCM method at the core node (C) is depicted in FIGS. 13(a) and 13(b). Some of the congestion periods lasted for more than few tens of seconds, thereby incurring potential packet loss for greater periods. In contrast, most of the congestion periods are confined within milliseconds time scale and rarely to a small fraction of second in the DCM method as depicted in FIGS. 14(a) and 14(b). The mean duration of congestion periods of non- DCM method is of 2.3152 seconds at a utilization factor of 0.8 and an average duration of 2.7179 seconds at a utilization of 0.9. In comparison, the mean duration of congestion periods for the DCM method are 0.1849 and 0.2110 seconds for the utilization factors of 0.8 and 0.9 respectively. Thus the DCM method is able to reduce the duration of congestion periods at least by a factor of 10. This leads to potentially less packet loss at the core nodes (C) as already elucidated in the table in FIG. 10. The only overhead incurred is the LCN messages across the ingress (I) and egress nodes (E) that constitutes only a small fraction of bandwidth. Thus, the DCM method is quite robust in confining potential congestion periods to small durations, thereby improving overall utilization of core bandwidth.

Figure 15:
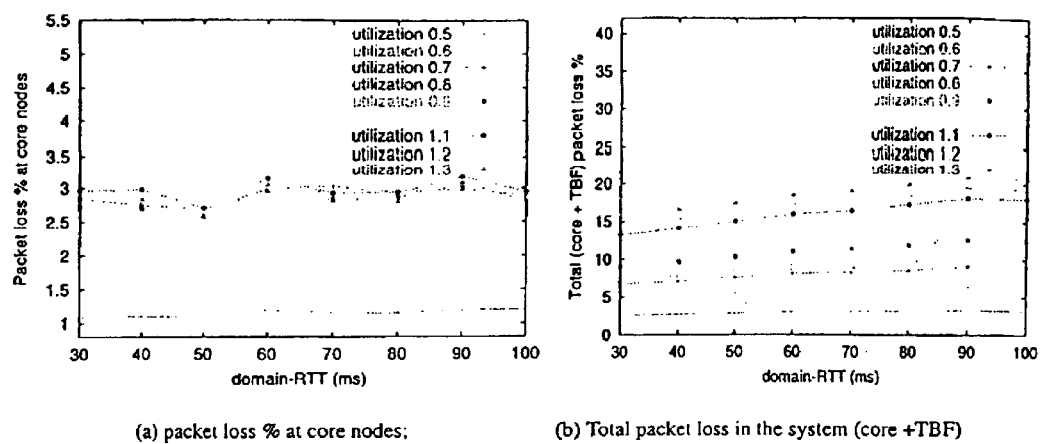
FIG. 15 illustrates the performance of the DCM method with domain-RTT variation.

As noted infra, the RTrs that correspond to various labels (js or traffic aggregates) are of same order. However, in order to assess the impact of the domain-RTT, denoted by the largest $RTT^j$ of a given Diff-serv domain, the domain-RTT is varied. The smaller RTTs of other traffic aggregates are taken to be within 5% of domain-RTT. FIGS. 15($a$) and 15($b$) shows the impact of domain-RTT on the packet loss performance of the DCM method. The packet loss percentage at core nodes (C) is approximately bounded by 3% for the entire practical range of domain-RTT (30–100 ms) as depicted in FIG. 15($a$). This indicates that a variation in domain-RTT has minimal implication to the DCM operation in the domain.

However, the total system packet loss (core+TBF) increases slightly with domain-RTT as depicted in FIG. 15($b$). This increase is mainly due to the increase in packet loss at the ingress TBF queue. During the congestion-free phase when the domain-RTT is large, it takes a longer duration for the TBF to increase its sending rate (or equivalently decrease the $PktWt^j$). Thus, it cannot keep up with high incoming traffic at the ingress queue. This results in more packet loss at the ingress TBF than in the case of lower domain-RTT.

In the case of shorter domain-RTTs, it takes less time for ingress nodes to detect congestion-free periods via feedback messages. Therefore, it can quickly adjust/increase the traffic injection rates to cope with upcoming traffic. Thus, one way to cope with long domain-RTTs is to suitably configure a larger Diff-serv domain into smaller sub-domains such that the domain-RTTs are made smaller.

To summarize, during potentially strong congestion periods the packet loss is effectively reduced in the DCM method through traffic regulation at ingress TBFs. Thus, wasting of network resources by undeliverable packets during congestion periods is prevented. As a result, the DCM method enhances performance with respect to congestion detection/management under higher loads of network traffic.

In summary, the DCM feedback control method both enhances resource utilization and controls/manages potential congestion states that occur in a Diff-serv domain. The RED algorithm is improved by introducing two phases in congestion detection/management, marking and dropping.

In the marking phase, packets are deterministically marked in the queue whenever the minth threshold is exceeded by the average queue size. In the dropping phase, packets are probabilistically dropped whenever the average queue size exceeds the FeedbackThreshold value. This helps in early local congestion notifications that are sent by egress nodes (E) to corresponding ingress nodes (I).

Furthermore, a TBF-based adaptive traffic management method is presented that responds to LCN messages sent from egress nodes (E). The DCM method involves an exchange of information between edge nodes based on traffic aggregates between the corresponding ingress/egress nodes (I, E), and not on per-flow basis. This is a one advantage of the DCM method. Another advantage is quick detection/reaction to local congestion (-free) notification (LCN) messages from egress routers. The DCM method is based on feedback loop control mechanism between ingress (I) and egress nodes (E). Therefore, the edge routers handle the complexity of traffic regulation.

Simulation results indicate that the method is quite effective in improving the packet loss ratio under high utilization of network bandwidth. Moreover, the DCM method is simple and local to Diff-serv domain and can be easily implemented (due to single network administration policy of a Diff-serv domain).

While the invention has been disclosed in this patent application by reference to the details of preferred embodiments of the invention, it is to be understood that the disclosure is intended in an illustrative rather than in a limiting sense, as it is contemplated that modification will readily occur to those skilled in the art, within the spirit of the invention and the scope of the appended claims and their equivalents.

What is claimed is:

1. A method of detecting congestion, comprising:
    setting a minimum threshold, a maximum threshold and a feedback threshold for buffer occupancy;
    marking outgoing packets when said average queue size is between said minimum threshold and said feedback threshold;
    dropping incoming packets and marking said outgoing packets when said average queue size is between said feedback threshold and said maximum threshold; and
    dropping, all of said incoming packets when an average queue size exceeds said maximum threshold.

2. The method according to claim 1, wherein said average queue size is a size of a bucket of a token bucket filter.

3. The method according to claim 1, wherein said packets are marked deterministically in said step of marking outgoing packets when said average queue size is between said minimum threshold and said feedback threshold.

4. The method according to claim 1, wherein said packets are dropped probabilistically in said step of dropping incoming packets when said average queue size is between said feedback threshold and said maximum threshold.

5. The method according to claim 1, wherein said step of marking outgoing packets when said average queue size is between said minimum threshold and said feedback threshold comprises setting at least one bit in at least one of said packets, and said step of marking said outgoing packets when said average queue size is between said feedback threshold and said maximum threshold comprises setting at least one bit in at leas one of said packets.

6. The method according to claim 1, further comprising the step of calculating said average queue size based on a moving average.

7. The method of according to claim 1, further comprising the steps of:
    varying a number of tokens consumed by a data packet; and
    transmitting said packet if the number of tokens consumed by said packet is less and or equal to available tokens.

8. The method according to claim 5, wherein said bit is part of a type of services byte.

9. The method according to claim 5, wherein a core node performs said step of setting said bit.

10. The method according to claim 5, wherein said bit is a local congestion notification an bit.

11. The method according to claim 6, wherein said moving average is an exponential moving average.

12. The method according to claim 7, wherein said step of varying the number of tokens consumed by a data packet comprises varying the number of tokens consumed by data of unit size.

13. The method according to claim 7, wherein said step of varying said number of tokens comprises the step of decreasing data of unit size monotonically if demand increases monotonically during a congestion free period.

14. The method according to claim 7, wherein said step of said number of tokens comprises the step of increasing data of unit size upon receipt of a message.

15. The method according to claim 8, wherein said type of services byte is a differentiated services code point byte.

16. The method according to claim 11, wherein said packets are masked deterministically in said step of marking outgoing packets when said average queue size is between said minimum thershold and said feedback threshold, wherein said packets arm dropped probabilistically in said step of dropping incoming packets when said average queue size is between said feedback threshold and said maximum threshold, and wherein said step of marking outgoing packets when said average queue size is between said minimum threshold and said feedback threshold comprises a core node setting at least one bit in at least one of said packets and said step of marking outgoing packets when said average queue size is between said feedback threshold and said maximum threshold comprises setting at least one bit in at least one of said packets, wherein said bit is part of a type of services byte.

17. The method according to claim 14, wherein said step of varying said number of tokens comprises further decreasing said data of unit size if an average queue size is greater than a demand threshold.

18. A method of regulating traffic flow between nodes, comprising:
   detecting congestion;
   sending a message to at least one node;
   regulating at least one traffic rate of said at least one node by varying a number of tokens consumed by a data packet by varying the number of tokens consumed by data of unit size, comprising the steps of:
      decreasing said data of unit size monotonically if demand increases monotonically during a congestion free period;
      further decreasing said data of unit size if an average queue size is greater than a demand threshold;
      increasing said data of unit receipt of a message; and
      transmitting said packet if a number of tokens consumed by said packet is less than available tokens, wherein said at least one packet is marked deterministically; and
   detecting when congestion is clear.

19. The method according to claim 18, further comprising the step of incrementing said at least one traffic rate at random times when said congestion is clear.

20. The method according to claim 18, wherein a core node detects said congestion, and
   an output node sends said message to at least one input node.

21. The method of according to claim 18, wherein said stop of regulating at least one traffic rate of said at least one node, comprises:
   reducing said at least one traffic rate of said at least one node proportional to the amount of traffic that said at least one node is injecting when said congestion is detected.

22. The method according to claim 18, wherein said step of sending a message to at least one node comprises marking at last one packet.

23. A method of regulating traffic flow between nodes, comprising:
   detecting congestion;
   sending a message to at least one node;
   regulating at least one traffic rate of said at least one node, wherein said step of regulating at least one traffic rate of said at least one node, comprises:
      varying a number of tokens consumed by a data packet by decreasing data of unit size monotonically if demand increases monotonically during a congestion free period; and
      transmitting said packet if a number of tokens consumed by said packet is less than or equal to available tokens; and
   detecting when congestion is clear.

24. A method of regulating traffic flow between nodes, comprising:
   detecting congestion;
   sending a message to at least one node;
   regulating at least one traffic rate of said at least one node, wherein said step of regulating at least one traffic rate of said at least one node, comprises:
      varying a number of tokens consumed by a data packet by increasing data of unit size upon receipt of a message; and
      transmitting said packet if a number of tokens consumed by said packet is less than or equal to available tokens; and
   detecting when congestion is clear.

25. A method of regulating traffic flow between nodes, comprising:
   detecting congestion;
   sending a message to at least one node by marking at one packet, wherein said packet is marked deterministically;
   regulating at least one traffic rate of said at least one node; and
   detecting when congestion is clear.

26. A method of regulating traffic flow between nodes comprising:
   detecting congestion;
   sending a message to at least one node by at least one packet wherein said step of marking packets comprises setting at least one bit in at least one of said packets;
   regulating at least one traffic rate of said at least one node; and
   detecting when congestion is clear.

27. The method according to claim 23, wherein said step of varying said number of tokens comprises further decreasing said data of unit size if an average queue size is greater than a demand threshold.

28. The method according to claim 26, wherein said bit is part of a type of services byte.

29. A method of controlling traffic flow in a differentiated services domain, comprising:
   determining available bandwidth by calculating an average queue size at token bucket filter;
   determining if said average queue size is greater than a demand threshold;
   varying a number of tokens consumed by a data packet; and
   transmitting said data packet if a number of tokens consumed by said data packet is less than or equal to available tokens.

30. The method according to claim 29, wherein said step of varying the number of tokens consumed by a data packet comprises varying the number of tokens consumed by data of unit size.

31. The method according to claim 29, wherein said number of tokens consumed by a data packet is varied based on state and demand.

32. A method of controlling traffic flow in a differentiated services domain, comprising:
varying a number of tokens consumed by a data packet, wherein said step of varying said number of tokens consumed by a data packet comprises a step of decreasing data of unit size monotonically if demand increases monotonically during a congestion free period; and
transmitting said data packet if a number of tokens consumed by said data packet is less than available tokens.

33. A method of controlling traffic flow in a differentiated services domain, comprising:
varying a number of tokens consumed by a data packet, wherein said step of varying said number of tokens comprises a step of increasing data of unit size upon receipt of a message; and
transmitting said data packet if a number of tokens consumed by said data packet is less than available tokens.

34. The method according to claim 30, wherein said step of varying the number of tokens consumed by data of unit size comprises varying the number of tokens consumed by a byte of data.

35. The method according to claim 30, wherein said step of varying the number of tokens consumed by data of unit size, comprises varying the number of tokens consumed by a bit of data.

36. A method of controlling traffic flow in a differentiated services domain, comprising:
varying a number of tokens consumed by a data packet by varying the number of tokens consumed by data of unit size, wherein a minimum number of tokens consumed by said data of unit size equals a depth of a token bucket filter divided by a min-max fair share of the buffer; and
transmitting said data packet if a number of tokens consumed by said data packet is less than or equal to available tokens.

37. A method of controlling traffic flow in a differentiated services domain, comprising:
varying a number of tokens consumed by a data packet by varying the number of tokens consumed by data of unit size, wherein a minimum number of tokens consumed by said data of unit size equals a depth of a token generation rate divided by a min-max fair share of the bandwidth; and
transmitting said data packet if a number of tokens consumed by said data packet is less than or equal to available tokens.

38. A method of controlling traffic flow in a differentiated services domain, comprising:
varying number of tokens consumed by a data packet by varying the number of tokens consumed by data of unit size, wherein a maximum number of tokens consumed by said data of unit size equals a depth of a token bucket filter divided by a maximum transmission unit; and
transmitting said data packet if a number of tokens consumed by said data packet is less than or equal to available tokens.

39. A method of controlling traffic flow in a differentiated services domain, comprising:
varying a number of tokens consumed by a data packet by varying the number of tokens consumed by data of unit size wherein a maximum member of tokens consumed by said data of unit size equals a token generation rate divided by a minimum data buffer drain rate; and
transmitting said data packet if a number of tokens consumed by said data packet is less than or equal to available tokens.

40. A method of controlling traffic flow in a differentiated services domain, comprising:
varying a number of tokens consumed by a data packet by varying the number of tokens consumed by data of unit size, wherein said step of varying the number of tokens consumed by data of unit size, comprise the steps of:
decreasing said data of unit size monotonically if demand increases monotonically during a congestion free period;
further decreasing said data of unit size if an average queue size is greater than a demand threshold; and
increasing said data of unit size upon receipt of a message, wherein said number of tokens consumed by a data packet is varied based on state and demand; and
transmitting said data packet if a number of tokens consumed by said data packet is less than or equal to available tokens.

41. The method according to claim 31, wherein said state is a congestion state.

42. The method according to claim 32, wherein said step of varying said number of tokens comprises further decreasing said data of unit size if an average queue size is greater than a demand threshold.

* * * * *